United States Patent [19]

Sakurai et al.

[11] 4,183,319
[45] Jan. 15, 1980

[54] APPARATUS FOR COATING HOSE

[75] Inventors: Yasuo Sakurai; Koji Kusumoto, both of Settsu, Japan

[73] Assignee: Ashimori Kogyo Kabushiki Kaisha, Osaka, Japan

[21] Appl. No.: 827,357

[22] Filed: Aug. 24, 1977

[30] Foreign Application Priority Data

Aug. 24, 1976 [JP] Japan ............................. 51-101322

[51] Int. Cl.² .......................... B05C 3/15; B05C 11/02
[52] U.S. Cl. ........................................ 118/44; 118/68; 118/125; 118/419
[58] Field of Search ............... 118/DIG. 10, DIG. 11, 118/DIG. 12, DIG. 13, 419, 407, 420, 405, 44, 413; 427/355, 356, 358, 434 B, 235; 26/80-86; 68/19, 21

[56] References Cited

U.S. PATENT DOCUMENTS

| 534,641 | 2/1895 | Tullar | 26/83 |
|---|---|---|---|
| 2,062,389 | 12/1936 | Bleibler | 118/122 |
| 2,193,887 | 3/1940 | Seeley | 118/125 |
| 2,324,645 | 7/1943 | Prehler | 118/105 X |
| 2,338,266 | 1/1944 | Skoning | 118/105 |
| 2,407,337 | 9/1946 | Kolter | 118/125 |
| 2,448,067 | 8/1948 | Wolff | 118/105 |
| 2,602,959 | 7/1952 | Fenlin | 118/405 X |
| 3,567,495 | 3/1971 | Gajdos | 427/238 |
| 3,864,794 | 2/1975 | Baumann | 26/82 |
| 4,032,677 | 6/1977 | Ichioka et al. | 118/405 X |

Primary Examiner—Morris Kaplan
Attorney, Agent, or Firm—Birch, Stewart, Kolasch & Birch

[57] ABSTRACT

In the manufacture of hose, a tubular textile is passed through one or more coating liquids, such as rubber or synthetic resin. An expander means, having a plurality of panels disposed radially about a shaft element so as to form a generally annular surface, and adapted to be centrifugally or centripetally movable by means of a spring mechanism mounted on said shaft, is disposed seriatim with the coating baths and are located within the tubular textile whereby to expand the coated tube during passage through drier means. Annular doctor means are disposed in operative association with said expander means and externally of said coated tube.

13 Claims, 13 Drawing Figures

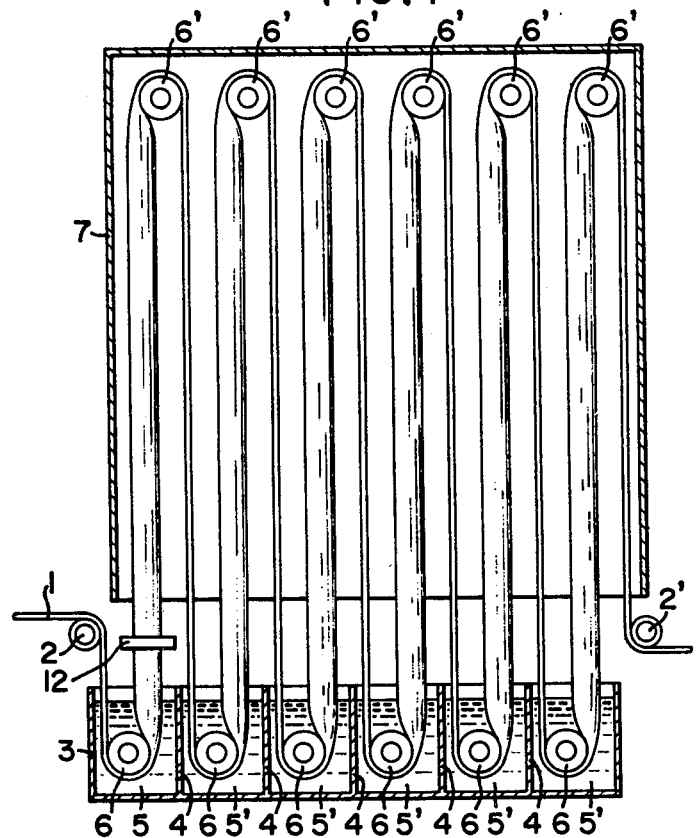
FIG. 1
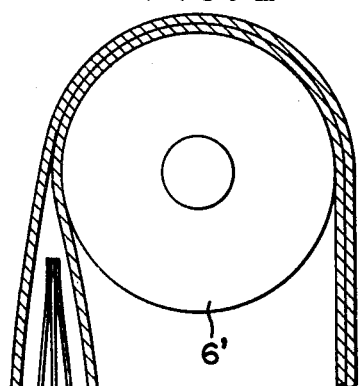
FIG. 2
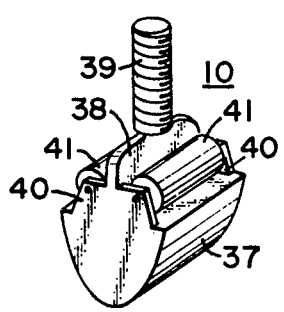
FIG. 7
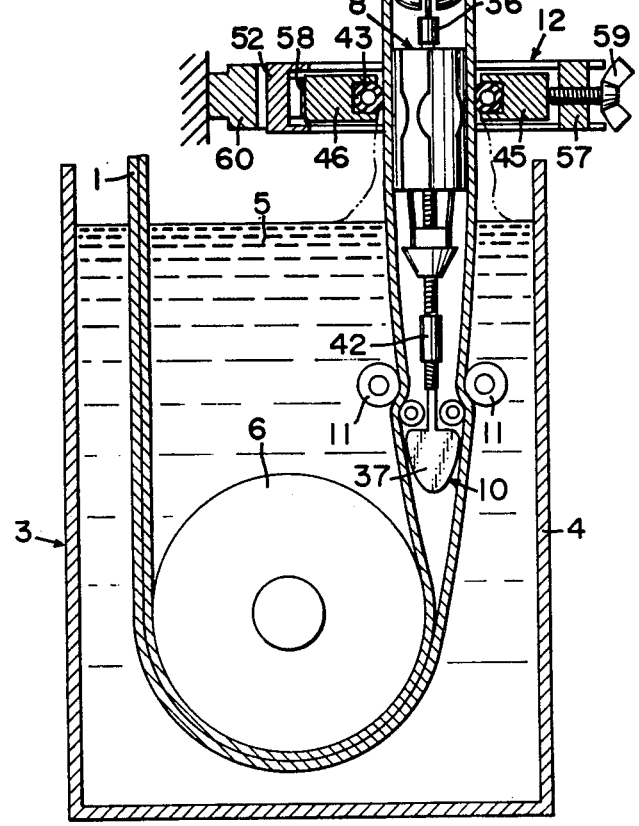

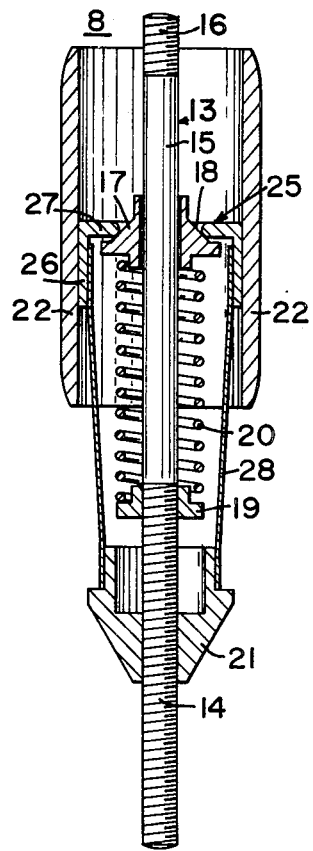
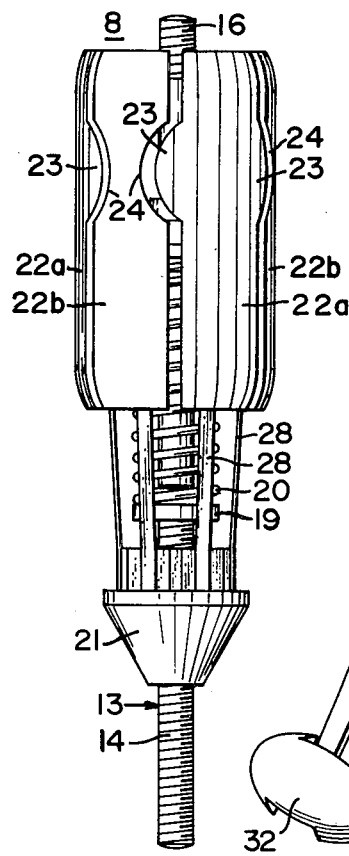
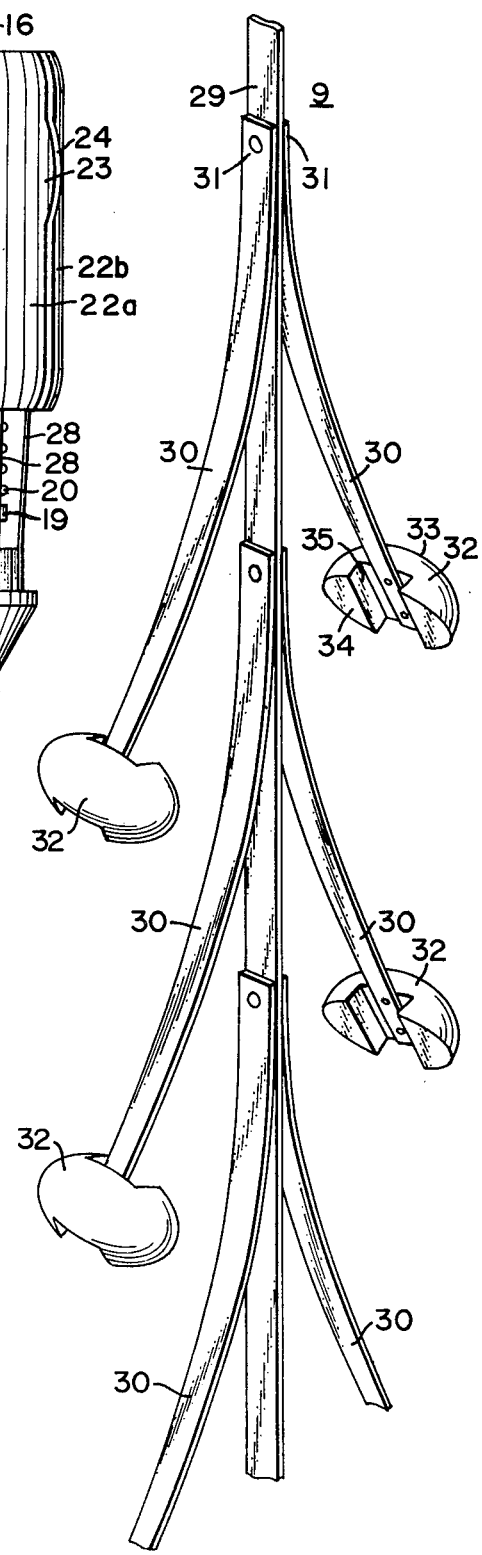
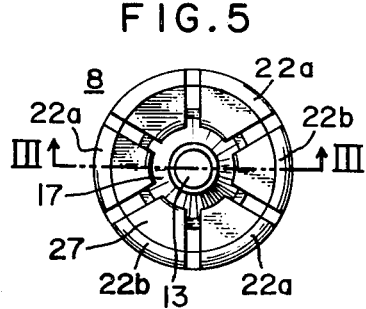

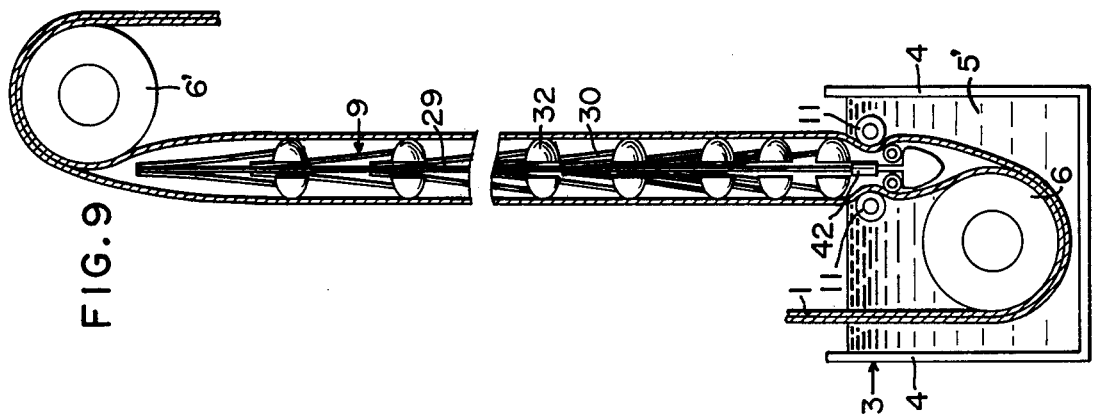
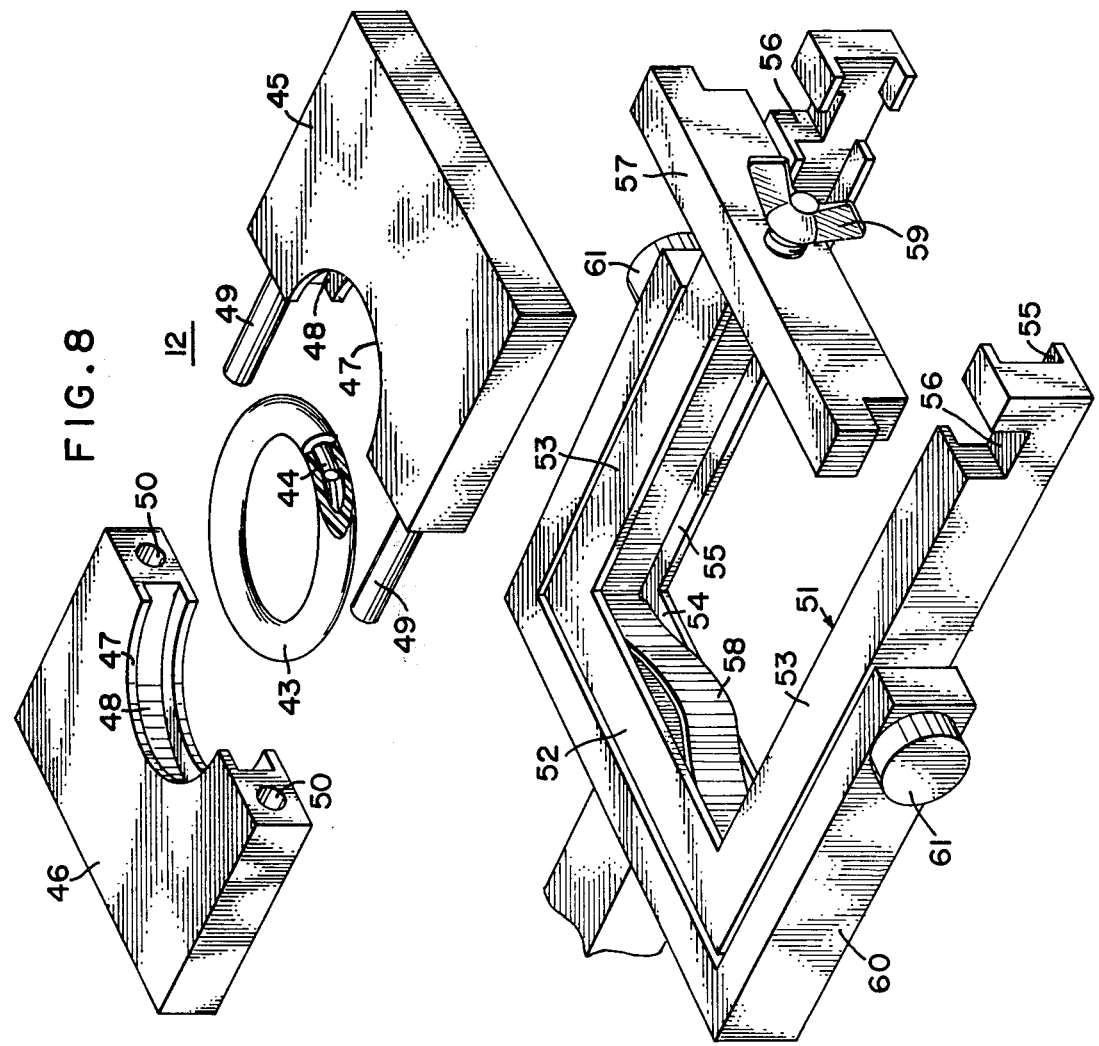

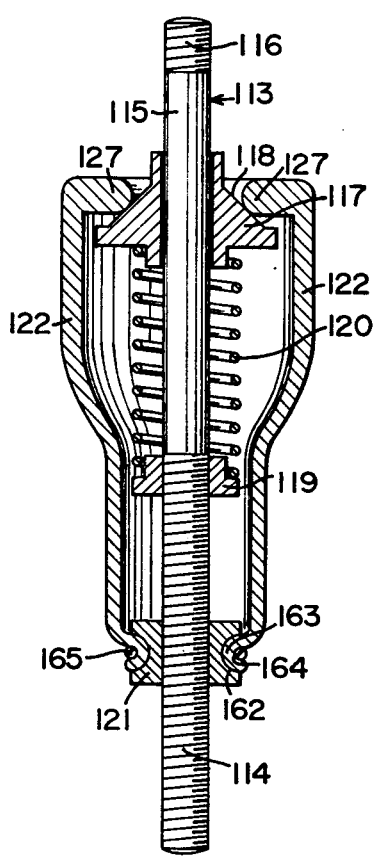
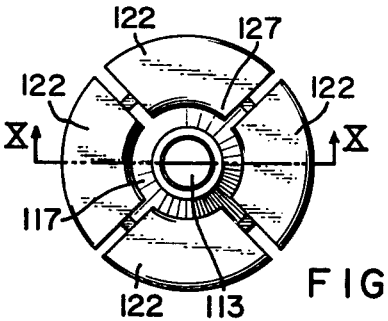
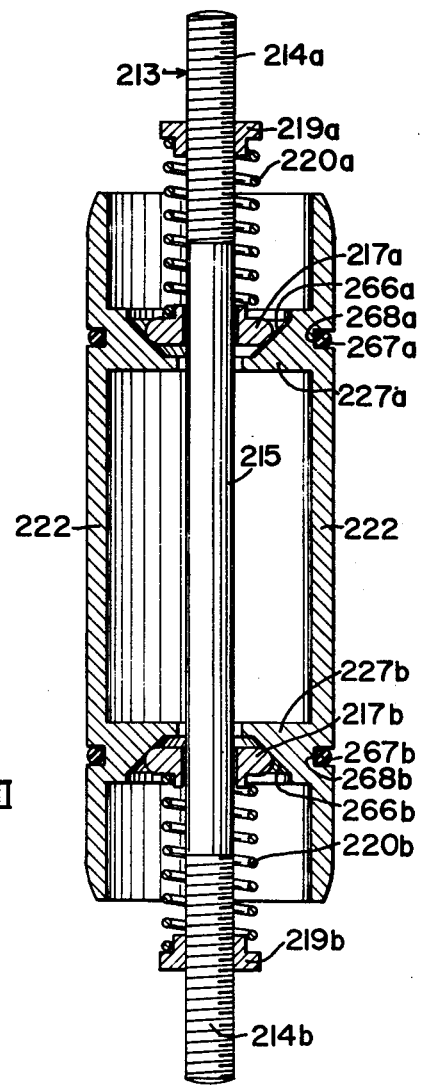
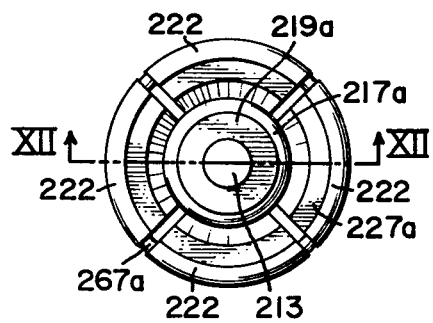

APPARATUS FOR COATING HOSE

BACKGROUND OF THE INVENTION

1. Field of the Invention

The present invention relates to an apparatus for the manufacture of a hose. More particularly, the present invention relates to an apparatus for the manufacture of a hose wherein a specific clogging liquid applicator is used at the initial stage of the coating treatment for a tubular textile jacket.

2. The Description of the Prior Art

Heretofore, it is widely known as a process for the manufacture of a hose that a coating of rubber or a synthetic resin is formed on the external surface of a tubular textile jacket usually made of fibers woven or knitted in a tubular form, and the resultant coated jacket is then evaginated. For example, the methods disclosed in British Pat. No. 957,927 and U.S. Pat. Nos. 3,437,537, 4,032,677 and 4,020,790 belong to a process of this type. In these conventional methods, a coating of rubber or a synthetic resin is formed on the external surface of a tubular textile jacket usually by passing the jacket through one or more baths of a coating liquid such as a latex or a solution of rubber or a synthetic resin and then the coating liquid attached to the external surface of the jacket is solidified.

The coating liquid usually used in the above mentioned prior art methods is of a relatively low viscosity, generally below 200 cp. Thus, the jacket is passed through a bath of a coating liquid having such a low viscosity whereby excess coating liquid attached to the external surface of the jacket is allowed to flow down freely before solidification to form a very thin coating on the surface of the jacket. This coating treatment is repeated several times to form a beautiful and smooth coating having an even, given thickness on the surface of the jacket without permitting the formation of undesirable pinholes and like imperfections in the coating.

However, a coating liquid of such a low viscosity is so high in penetrating force that it permeates to the internal surface of the jacket through the retiform texture. The internal surface of the jacket is, therefore, soiled, and, when the jacket is evaginated, the external surface of the resultant hose will be dirty with the penetrated latex or resin. As a means for preventing such defects in the final product, the pervious reticulate structure of the jacket is initially clogged with a clogging liquid to prevent permeation of the coating liquid through the retiform texture of the jacket. The most convenient method for clogging the pervious reticulate structure of the jacket comprises passing the jacket through a highly viscous clogging liquid such as a highly concentrated latex, a solution or a plastisol of rubbber or a synthetic resin or a molten liquid thereof, prior to the coating treatment with the coating liquid, and then squeezing the jacket for rubbing a part of the clogging liquid attached to the surface of the jacket into the interstices or voids in the retiform texture of the jacket and removing the remaining larger part of the clogging liquid. A clogging liquid with a viscosity between 1,000 cp. and 20,000 cp, inclusive, can effectively clog the interstices or voids in the reticulate structure of the jacket without penetrating therethrough.

A difficult problem arises in this case. Because of the tubular structure of the jacket, it is difficult to rub the clogging liquid into the interstices or voids evenly over the entire surface of the jacket. When the clogging liquid is wiped away from the surface of the jacket in flattened state with rollers or a doctor knife, the clogging liquid in the folded edge areas of the jacket cannot be removed and a unnecessarily large amount of the clogging liquid remains in these areas. Even if a special device is used to scrape off the clogging liquid from the folded edge areas, it is difficult to provide clogging of the interstices or voids evenly over the entire surface of the jacket.

On the other hand, it is possible to remove the clogging liquid by maintaining the jacket which has been passed through a bath of the clogging liquid in an inflated state with an expanding device and then providing a squeezing device in a ring formed around the inflated jacket to squeeze it evenly over the full circumference. According to this method, the jacket is in a uniform state over the full circumference and hence the clogging liquid can be applied evenly into the interstices or voids over the entire surface of the jacket without any problem of irregularity due to folding. This method requires, however, to keep the jacket almost circular in its cross section and to squeeze the external surface of the jacket evenly by a constant force over its entire circumference. Such requirements are difficult to realize in the existing processes actually put into practice because a small fluctuation in diameter of the jacket made by weaving or knitting fibers in a tubular form is unavoidable. In order to continuously operate the coating treatment, it is necessary to supply the jacket without inerruption. As the length of the jacket is limited or, in other words, it is practically impossible to provide a splice-free unlimitedly long tubular textile jacket, a splicing treatment of the jacket is necessary for continuously supplying it to the apparatus. In this case, the jointed portion of the jacket becomes harder and is increased locally in diameter. Thus, it is essential that the expanding device and the squeezing device have good compliance with fluctuations in the diameter of the jacket. In case a rigid mandrel as disclosed in U.S. Pat. No. 3,437,537 and a metal ring are used as an expanding device and a squeezing device, respectively, for applying a clogging liquid onto the surface of the jacket, these devices will not satisfactorily comply with fluctuation in the diameter of the jacket as seen in a spliced portion thereof. Consequently, even a slight change in diameter of the jacket makes squeezing uneven and, in the extreme case, the spliced portion of the running jacket cannot pass through a slit between the mandrel and the metal ring. In case an endless double-tubing as disclosed in U.S. Pat. No. 4,032,677 is used as an expanding device for the jacket in the treatment for applying thereto a clogging liquid, such double-tubing will inflate the jacket well, even if the diameter of the jacket changes to some extent but will dent when squeezed with a ring-shaped squeezing device to remove excess clogging liquid from the jacket. Thus, a good expanding device for the jacket in the treatment for applying thereto a coating liquid is not always suitable as an expanding device in the application of a clogging liquid to the hose jacket. In the above mentioned situation, there is a great demand for developing a new expanding device suitable for use in a treatment of the jacket with a clogging liquid.

BRIEF SUMMARY OF THE INVENTION

It is an object of the present invention to provide a clogging liquid applicator comprising a combination of a specific expanding assembly and a specific doctoring assembly.

It is another object of the present invention to provide a clogging liquid applicator capable of applying a clogging liquid evenly into the interstices or voids in a retiform texture of a tubular textile jacket.

It is still another object of the present invention to provide an apparatus for applying a clogging liquid evenly to the external surface of a tubular textile jacket wherein the cloging liquid applicator is used in serial combination with a proper expanding device for the jacket.

It is further object of the present invention to provide an apparatus for the manufacture of a hose wherein the clogging liquid applicator is used at the initial stage of the coating treatment for a tubular textile jacket.

These and other objects, features and advantages of the present invention will become more fully apparent as the description proceeds.

BRIEF DESCRIPTION OF THE DRAWING

FIG. 1 is a diagram showing a typical example of the apparatus of the present invention for applying a clogging liquid and a coating liquid onto the external surface of a tubular textile jacket;

FIG. 2 is a sectional view (longitudinal) of the initial one unit of the apparatus of FIG. 1 wherein a clogging liquid applicator is used and an expanding assembly is inserted in serial combination with an expanding device into the interior space of a tubular textile jacket;

FIGS. 3-5 show one embodiment of the expanding assembly of the clogging liquid applicator; FIG. 3 is a sectional view (longitudinal) of the assembly cut along the line III—III in FIG. 5, FIG. 4 is a front view of the assembly and FIG. 5 is a plan view of the assembly;

FIG. 6 is a perspective view of an expanding device to be connected to the rear of the expanding assembly of the clogging liquid applicator;

FIG. 7 is a perspective view of a holder for maintaining the expanding assembly and the expanding device in a definite position with respect to the clogging liquid in the bath;

FIG. 8 is a perspective view of one embodiment of the doctoring assembly wherein the elements are separated; and FIG. 9 is a sectional view (longitudinal) of the second unit of the apparatus of FIG. 1 for applying a coating liquid onto the external surface of the clogging liquid-treated tubular textile jacket wherein an expanding device is put in the interior space of the jacket.

DETAILED DESCRIPTION OF THE INVENTION

It has now been found that the above mentioned disadvantages in the prior art methods for manufacturing a hose, especially in the coating step can be overcome entirely by using a specific clogging liquid applicator at the initial stage of the coating step where a clogging liquid is applied first onto the external surface of the jacket.

In accordance with the present invention, there is provided a clogging liquid applicator comprising a combination of (a) an expanding assembly provided around its central longitudinal shaft with a plurality of discrete expanding panels devised to be centrifugally or centripetally movable by means of a spring mechanism and arranged annularly so that their external periphery forms a cylindrical surface and (b) a doctoring assembly provided with a ring of an elastic material having a size to be adapted around the expanding assembly.

In use of the apparatus of the present invention, there is illustrated a process for the manufacture of hose which comprises continuously passing a tubular textile jacket through one or more baths of a coating liquid possessing permeability such as a latex, a solution, paste or molten liquid of rubber or a synthetic resin, solidifying the coating liquid attached to the external surface of the jacket to form a tubular textile jacket having a coating of the rubber or synthetic resin on its external surface and then evaginating the jacket to make a hose. According to the present invention, the jacket is passed, prior to passing it through the one or more baths of the coating liquid, through a bath of a viscous clogging liquid, such as a highly concentrated latex, solution or plastisol of or molten liquid of rubber or a synthetic resin. A clogging liquid applicator comprising a combination of (a) an expanding assembly provided around its central longitudinal shaft with a plurality of discrete expanding panels devised to be contrifugally or centripetally movable by means of a spring mechanism and arranged annularly so that their external periphery forms a cylindrical surface and (b) a doctoring assembly provided with a ring of an elastic material having a size to be adapted around the expanding assembly are maintained in a definite position with respect to the clogging liquid in the bath and are arranged in such manner that the expanding assembly is inserted in serial combination with an expanding device for the jacket in the interior space of the jacket to inflate it to a circular cross section. The doctoring assembly is fitted tightly around the inflated jacket whereby a portion of the clogging liquid attached to the surface of the jacket is impregnated into the interstices or voids in the retiform texture of the jacket and at the same time the remaining larger portion of the clogging liquid is wiped away, and thereafter the clogging liquid is solidified to prevent penetration of the coating liquid into the internal surface of the jacket.

In the present invention, the tubular textile jacket may be manufactured from any of the well known fibrous materials woven or knitted in a tubular form. Preferred fibrous materials include natural and synthetic organic fibers and inorganic fibers such as cotton, linen, glass, regenerated cellulose and polyamide and polyester resins. The clogging liquid is preferably the same type as the coating liquid but has a high viscosity of at least about 1,000 cp., preferably 5,000-20,000 cp.

The clogging liquid and the coating liquid may contain a colorant and the like usually employed for the purpose of coating. Solidification of the clogging liquid or coating liquid may be effected at room temperature but it is preferably achieved by drying or curing under heat.

The present invention will now be described in more detail with reference to the accompanying drawings.

FIG. 1 is a schematic representation of the apparatus of the present invention for applying both a clogging liquid and a coating liquid onto the external surface of a tubular textile jacket as a substrate. A tubular textile jacket 1, maintained in a flattened condition, is supplied via a guide roll 2 into the aparatus and taken out via another guide roll 2'. A container 2 is situated in the lower part of the apparatus and is divided into several compartments by partitions 4. A lower roll 6 is rotatably disposed in each compartment while an upper roll 6' is also rotatably mounted near the top of the apparatus. An upper part of the apparatus is constructed as a heating oven 7. The first compartment of the container 3 is filled with a clogging liquid 5 composed predominantly of rubber latex and the rest of the compartments are filled with a coating liquid 5' composed also of a diluted rubber latex. In addition to the rubber latex, any liquid capable of forming a strong coating after solidification by drying, heating or cooling, such as a solution, a plastisol or a molten liquid or rubber or a synthetic resin can be used as the clogging liquid and the coating liquid. The clogging liquid 5 is desirably of a relatively high viscosity and one having a viscosity of 1,000–20,000 cp. is preferable. If the viscosity is higher than 20,000 cp., the clogging liquid will not satisfactorily permeate into the reticulate structure of the jacket, thus failing to clog the interstices or voids thereof. On the other hand, if the viscosity is too low, the clogging liquid will penetrate to the internal surface of the jacket through the retiform texture thereof and cause soiling of the final product when the jacket is evaginated. The viscosity of the coating liquid 5' should be determined, taking such factors into consideration as desired thickness of the coating, repeated cycles of the coating treatment, conditions for solidification, concentration of the coating liquid and the like. In general, a coating liquid having a viscosity of 10–200 cp. is used. The textile tubular jacket 1 in a flattened condition is supplied from an adequate supplying device such as a feed reel (not shown) and first dipped through the guide roll 2 downwardly into the clogging liquid 5 placed in the first compartment of the bath container 3. The downwardly running jacket is then turned upwardly by the action of the lower roll 6 and allowed to ascend. The expanding assembly of the clogging liquid applicator is inserted together with a usual expanding device in the interior space of the ascending jacket and held at a definite position with respect to the clogging liquid in the bath. On the other hand, the doctoring assembly 12 of the applicator is fitted tightly around the ascending inflated jacket whereby a large amount of excess clogging liquid is wiped away from the surface of the jacket. The clogging liquid 5 permeated in interstices or voids in the retiform texture of the jacket 1 is then solidified while the jacket is passed in inflated state through the heating oven 7. The ascending jacket 1 thus treated is turned downwardly by the action of the upper roll 6' and then dipped into a coating liquid 5' placed in the second compartment of the bath container 3. When the jacket is drawn from the coating liquid 5', a proper expanding device as disclosed in U.S. Pat. No. 4,020,790 is put in the interior space of the jacket 1 to keep it in fully inflated state for a predetermined distance. The jacket 1 runs upwardly while in an inflated condition and enters into the heating oven 7 where the jacket 1 is heated by hot blast, infra red ray lamp or a like heat source. The coating liquid 5' attached to the external surface of the jacket is then completely solidified by drying or curing. This coating treatment is repeated until the coating of a desired thickness is formed on the external surface of the jacket 1.

In FIG. 2, the expanding assembly 8 of the clogging liquid applicator in serial combination with a proper expanding device 9 is placed in the interior space of the jacket 1 and is connected to a holder 10 which is maintained by a pair of supporting rolls 11 in a definite position with respect to the clogging liquid 5 in the bath 3. The doctoring assembly 12 of the applicator is fitted around the outer circumference of a portion of the jacket 1 in contact with the expanding assembly 8 so that the doctoring assembly 12 faces the expanding assembly 8 across the jacket 1.

FIGS. 3–5 show an example of the expanding assembly 8, wherein a shaft 13 extends in longitudinal direction at the center thereof. The shaft 13 forms a male screw 14 in the lower part thereof and forms a smooth portion 15 in the upper part thereof. At the top of the shaft 13 there is also formed a male screw 16. Around the smooth portion 15 of the shaft 13 there is fitted a slidable ring 17 which can slide freely along the smooth portion 15 and has a tapered facet 18 which has its widest portion at the bottom and its narrowest portion at the top. The male screw 14 of the shaft 13 is engaged with a supporting element 19 which is tightened at the top of the screw portion 14. A compressible spiral spring 20 is inserted between the supporting element 19 and the slidable ring 17 and always pushes the slidable ring 17 upward. A supporting nut 21 is engaged with the male screw 14 of the shaft 13. Six discrete expanding panels 22 are roughly shaped like a cylinder cut into six equal pieces. Among these, three expanding panels 22a form on the side edges thereof protuberances 23 and the remaining three panels 22b form indents 24 which fit with the protuberances 23. The expanding panels 22a and 22b are arranged alternately around the shaft 13. If the protuberances 23 and the indents 24 are tightly fitted into each other, the outer surface of the expanding panels 22 will form a whole cylindrical surface with a slightly smaller diameter than the inner diameter of the jacket 1. To the central part of the inner surface of each expanding panel 22 is fixed one arm of an L-shaped metal element 25. The other arm of the metal element 25 forms a contact piece 27 protruding inwardly from the expanding panel 22, the inner end of which is arc-shaped and contacts the tapered facet 18 of the slidable ring 17. Each expanding panel 22 is movably supported by the supporting nut 21 through a plate spring 28. The movement of the expanding panels is chiefly the centrifugal or centripetal direction, but they are also movable in the lateral direction.

FIG. 6 shows a preferable example of the expanding device 9, wherein a supporter 29 is made of a flexible material such as a plate spring. The branches 30 which are also made of a flexible material such as a platic spring are fixed to the supporter 29 in pairs at their base portions 31 and are separated from the supporter 29 at their tips. To the tips of the branches 30 are fixed pressing parts 32. The surface 33 of the pressing part 32 facing the outside is hemispherical or hemiellipsoidal. On the surface 34 of the pressing part 32 facing the support 29 there is made a furrow in which a tip of the branch 30 is fixed to the pressing part. When the expanding device 9 is put in the interior space of the jacket 1, the pressing parts 32 press the jacket 1 outwardly from the inside thereof by the spring biased action of the branches 30 whereby the jacket 1 is inflated to an almost circular or elliptical cross section.

To the lower end of the supporter 29 is fixed a tube 36 with a female screw, as seen in FIG. 2, with which the male screw 16 formed at the top of the shaft 13 of the expanding assembly 8 is engaged so that the connected expanding assembly 8 is detachable at need for the expanding device 9. The expanding device 9 shown in FIG. 6 is of the same type as disclosed in U.S. Pat. No. 4,020,790.

In FIG. 7, a holder 10 comprises a base portion 37 having a bullet-shaped cross section at the lower part and a base plate 38 at the upper center. At the top of the basal plate 38 is fixed a bolt 39 with a male screw the direction of which is opposite to that of the male screw 14 of the shaft 13 of the expanding assembly 8. On both ends of the base portion 37 are provided flanges 40, between which a pair of rotatable rolls 41 is supported by axes. The holder 10 and the expanding assembly 8 are detachably connected by engaging a turnbuckle 42 with the tip of the male screw portion 14 of the shaft 13 of the expanding assembly 8 and the bolt 39 of the holder 10.

In FIG. 8 showing one example of the doctoring assembly 12, the inner diameter of the squeezing ring 43 made of an elastic material such as rubber or a synthetic resin is slightly smaller than the outer diameter of the jacket 1. The squeezing ring 43 may be an originally shaped ring such as O-ring or, as shown in FIG. 8, a tube of a flexible rubber or plastic material bent to form a circle, the two terminal ends thereof being connected with a flexible connecting bar 44. A pair of ring supporters 45 and 46 is used to support the squeezing ring 43. These supporters have a semicircular indented portion 47 on one of their sides. In the indented portion 47, there is engraved a furrow 48. The squeezing ring 43 is supported by connecting the ring supporters 45 and 46 in such a manner that their indented portions 47 face each other with the squeezing ring 43 being fitted within the furrows 48. On the contact surfaces of one of the ring supporters 45, there are implanted pins 49 which fit into holes 50 drilled on the contact surfaces of the other ring supporter 46, thereby detachably connecting the ring supporters 45 and 46 together. A frame 51 capable of holding the ring supporters 45 and 46 comprises a base frame 52 and side frames 53 rectangularly extending from both ends of the base frame. On the inner surfaces of the base frame 52 and the side frames 53 there are provided furrows 54 and 55 into which the ring supporters 45 and 46 fit. At the tips of the side frames 53 there are formed cutout portions 56 with which a rid frame 57 is engaged whereby the ring supporters 45 and 46 are tightly held. A plate spring 58 is inserted in the furrow 54 of the basal frame 52 pushes the ring supporter 45 against the ring supporter 46. A bolt 59 screwed in at the center of the rigid frame 57 controls the force with which the ring supporters 45 and 46 push against each other. The tips of a roughly U-shaped supporting frame 60 rotatably supports the center of side frames 53 of the frame 51 with pins 61.

In FIG. 9 showing one unit of the coating treatment for applying a coating liquid onto the external surface of the jacket 1, the expanding device 9 inserted into the interior space of the jacket 1 is held at a definite position by the holder 10 and a pair of the supporting rolls 11. The expanding device 9 and the holder 11 may be the same as shown in FIGS. 6 and 7 and are connected directly.

According to the process of this invention, a coating of rubber or a synthetic resin on the external surface of the jacket 1 is carried out in the following manner.

The jacket 1 is supplied in a flattened state from a proper feeding device (not shown) and introduced through a guide roll 2 into the clogging liquid 5 placed in the first compartment of the bath container 3. The running jacket 1 is then turned by the action of the lower roll 6 and runs upwardly. In the position where the jacket 1 is drawn from the clogging liquid 5, the expanding assembly 8 is inserted into the interior space of the jacket 1. Within the expanding assembly 8 the slidable ring 17 is at all time pushed upward by the spring action of the compressible spiral spring 20 so that the expanding panels 22 are outwardly pushed through the L-shaped metal elements 25 in contact with the tapered surface 18 of the slidable ring 17. Therefore, the jacket 1 is inflated to form a circle in its cross section by the action of the expanding panels 22. When the internal diameter of the jacket 1 fluctuates, the slidable ring 17 accordingly slides up and down along the shaft 13, and the expanding panels 22 swing according to the change in the inner diameter of the jacket 1. The expanding assembly 8 can thus readily comply with the change in diameter of the jacket 1 as encountered in spliced portions thereof. The expanding assembly 8 can always inflate the jacket 1 to almost a circle in its cross section with a constant force. On the other hand, the squeezing ring 43 is fitted around the outer circumference of the jacket 1 inflated to form a circle in its cross section. The squeezing ring 43 made of an elastic material closely contacts and presses the external surface of the inflated jacket 1 whereby the squeezing ring evenly presses the entire circumference of the jacket 1 and can evenly squeezed out excess clogging liquid attached to the surface of the jacket and at the same time impregnate a part of the clogging liquid into interstices or voids in the reticulate structure of the jacket. When the outer diameter of the jacket 1 changes slightly, the elastic squeezing ring 43 can comply with such a change. Even when the outer diameter of the jacket 1 locally changes significantly as seen in the spliced portions of the jacket, the jacket 1 can pass through the squeezing ring 43 by temporarily increasing the diameter of the ring 43. The use of the ring supporters 45 and 46 and the frame 51 is convenient because, when the diameter of the squeezing ring 43 is increased, the separation between the ring supporters 45 and 46 widens against the resilience of the plate spring 58, thus allowing increase in diameter of the squeezing ring 43.

The jacket into which the clogging liquid has been rubbed continuously ascends and is passed through the expanding device 9 inserted into the jacket just above the expanding assembly 8. The pressing parts 32 of the expanding device 9 press the jacket outwardly from the inside by the resilience of the branches 30 and expand the jacket 1 to form a circle or ellipse in its cross section. Because the expanding device 9 has a plurality of pairs of pressing parts 32, the jacket 1 is expanded repeatedly and hence does not return to the flattened state over the full length of the ascending portion.

The expanding assembly 8 and the expanding device 9 are both held in a definite position by the holder 10 connected below the expanding assembly 8 and a pair of supporting rolls 11. The holder 10 tends to ascend due to friction created between the expanding assembly 8 and the expanding device 9 and the jacket 1 but is prevented from its ascending movement by the action of the rotatable rolls 41 of the holder 10 coming into contact with a pair of the supporting rolls 11 across the jacket 1. Therefore, the jacket 1 ascends between the supporting rolls 11 and the rotatable rolls 41 while both of them rotate.

The ascending jacket 1 then enters into the heating oven 7 where the jacket 1 is heated to solidify the clogging liquid rubbed into the interstices or voids in the pervious reticulate structure of the jacket. The clogging treatment for the jacket 1 is thus finished.

The ascending jacket is then turned downwardly by the action of the upper roll 6' and the descending jacket is dipped in a flattened state into the coating liquid 5' placed in the second compartment of the bath container 3 and again turned upwardly by the lower roll 6. The expanding device 9 supported by the holder 10 is inserted into the interior space of the ascending portion of the jacket 1 whereby the pressing parts 32 press the folded edge areas of the jacket 1 outwardly from the inside and inflate the jacket 1 to form a circle or ellipse in its cross section. Thus, the coating liquid 5' is evenly applied onto the external surface of the jacket 1 to form a uniform coating of an even thickness on the surface. The jacket is then entered into the heating oven 7 where the coating liquid 5' is dried and solidified to form a coating on the external surface of the jacket. This coating treatment is repeated until a coating of a desired thickness is formed evenly on the external surface of the jacket. After the formation of a coating having a desired thickness, the tubular textile jacket is removed from the oven via a guide roll 2' and wound around a reel (not shown). The resulting tubular textile jacket with a coating on its external surface is then evaginated according to a usual method, for example, the method disclosed in U.S. Pat. No. 3,927,164 to form a hose having the coating as a lining thereof. Since the plural movable expanding panels 22 inserted into the jacket 1 presses the inner surface of the jacket 1 by the resilience of the spiral spring 20 and since the squeezing ring 43 made of an elastic material is fitted tightly around the outer circumference of the jacket 1, excess clogging liquid is entirely wiped away from the jacket 1 inflated to form a circle in its cross section. Furthermore, because the expanding panels 22 and the squeezing ring 43 can comply with fluctuation in diameter of the jacket 1 especially in the spliced portion thereof, the squeezing is effected evenly over the entire surface of the jacket and a definite amount of the clogging liquid is rubbed into the interstices or voids in the jacket.

The heating oven 7 is devised to dry or fuse the clogging liquid 5 or coating liquid 5' applied onto the surface of the jacket, according to the nature of the applied liquid. If the clogging liquid 5 or coating liquid 5' is a latex or a solution of rubber or a synthetic resin, it should be dried in the heating oven 7. If the applied liquid is a paste, it should be molten. If a molten resin such as a melt of ethylene-vinyl acetate copolymer is used as the clogging or coating liquid, a cooling zone should be used, as a matter of course, in place of the heating oven 7.

The expanding assembly 8 used in the present invention are only required to comprise plural expanding panels being at all times pushed outwardly or centrifugally by a spring mechanism and annularly arranged so that the outer circumference of the panels forms a cylindrical surface.

FIGS. 10 and 11 show another example of the expanding assembly, a shaft 113 has wherein a male screw 114 in the lower portion thereof, a smooth portion 115 in the upper half portion and a male screw 116 at the top portion thereof. A slidable ring 117 slidably fitted around the smooth portion 115 and has a tapered surface 118. Between a supporting member 119 tightened at the top end of the male screw 114 and the slidable ring 117 there is inserted a compressible spiral spring 120. A supporting nut 121 screwed around the male screw 114 has a furrow 162 engraved in its outer surface. Four expanding members 122 are annularly arranged to form a cylinder with a step, the upper part being greater in diameter than the lower part. The maximum diameter of the upper part is slightly smaller than the external diameter of the jacket. The upper end of each expanding member 122 is bent inside to form a contact part 127, the inner margin of which is arc-shaped and is contacted with the tapered surface 118 of the slidable ring 117. The lower end of each expanding member 122 is bent inside and further bent in a U-shape to form a holding part 163 which fits into the furrow 162 of the supporting nut 121. An O-ring 165 is fitted into the furrow 164 on the outer surface of the U-shaped portion of the expanding member 122. Hence, the expanding members 122 are movably supported by the supporting nut 121 by means of the holding part 163 and the furrow 162. In this device, the slidable ring 117 is pushed upwardly by the resilience of the compressible spiral spring 120 and the expanding members 122 are pushed outward around the holding part 163 as a pivot via contact parts 127 in contact with the tapered surface 118, whereby their upper part with the greater diameter inflates the jacket to form a circle in its cross section.

FIGS. 12 and 13 show still another example of the expanding device used in the present invention, wherein a shaft 213 comprises a smooth portion 215 in the center and male screw 214a and 214b on both ends. Between slidable rings 217a and 217b slidably fitted around the smooth portion 215 of the shaft 213 and supporting parts 219a and 219b screwed around the male screws 214a and 214b on the shaft 213 are inserted spiral springs 220a and 220b which push the slidable rings 217a and 217b toward the center of the shaft 213. A pair of contact parts 227a and 227b is formed inside each of four expanding members 222 forming a cylindrical surface. On the inner tip of the contact parts 227a and 227b are formed tapered surfaces 266a and 266b where the contact parts 227a and 227b are in contact with the slidable rings 217a and 217b. O-rings 267a and 267b fit into furrows 268a and 268b formed on the outer surfaces of the expanding members 222 thereby holding the expanding members 222 in their position.

In this example, the slidable rings 217a and 217b pushed by the resilience of the springs 220a and 220b push the tapered surfaces 266a and 266b of the contact parts 227a and 227b, thereby outwardly pushing the expanding members 222 against the constricting force of the O-rings 267a and 267b. Because two slidable rings and two contact parts, which operately separately, are provided in this example, the expanding members can be longer and hence a longer portion of the jacket can be inflated.

Side edges of the expanding members of the expanding device may be straight as in examples shown in FIGS. 10, 11, 12 and 13, but may have protuberances and indented portions as seen in an example of the expanding panels shown in FIGS. 3, 4 and 5, which fit into each other and removes the influence of the openings between the expanding panels or members, thus more completely maintaining the jacket a circular in its cross section. The relation between the protuberance and the indented portion is not limited to the one shown in FIG. 4. An expanding panel or member may have a protuberance on one of its side edges and an indented portion on the other, or protuberances and intended portions may be provided alternately on the same edge, forming a zigzag pattern.

The expanding device 9 connected above the expanding assembly 8 is not always necessary, although preferable. If the jacket 1 reverts to the flattened state before the clogging liquid which penetrates into the interstices or voids in the jacket is solidified, the clogging liquid which originally clogged the interstices or voids in the folded edge areas of the jacket may deform, leaving the interstices or void open. For the above reason, it is desirable to insert an expanding device 9 into the jacket, as shown in the preceding examples, to prevent the jacket from reverting to the flattened state while the clogging liquid is solidified. The expanding device used in this step may not be one which can inflate the jacket 1 to form a complete circle in its cross section like the expanding assembly 8. It only needs to inflate the folded edge areas of the jacket which are bent at a small angle. An expanding device as shown in U.S. Pat. No. 4,020,790 is satisfactory for this purpose. The jacket may be inflated with an air bag, for example, an endless double-tubing disclosed in U.S. Pat. No. 4,032,677.

The method for applying a clogging liquid or a coating liquid onto the external surface of the jacket may be carried out according to any of the known conventional methods. In the foregoing example, a process disclosed in U.S. Pat. No. 4,020,790 is used, but any other method may be employed as needed.

In the foregoing example, the coating treatment is conducted only once for applying a clogging liuqid onto the external surface of the jacket. If necessary, however, the coating treatment for applying the clogging liquid may be repeated several times to clog the interstices or voids in the jacket completely. For example, it is possible to treat the jacket first with a primary clogging liquid having a viscosity of 5,000–20,000 cp. once or twice and then with a secondary clogging liquid having a relatively low viscosity of 500–3,000 cp. once or twice. When the jacket used is of a relatively loose pervious texture, the coating treatment with the clogging liquid is preferably repeated several times to attain complete clogging of the jacket.

According to the present invention, it is now possible to obtain the final product without soil with a penetrating clogging liquid. Thus, the present invention is valuable in the field of hose manufacturing.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An applicator apparatus for uniformily distributing a viscous liquid on the surface of a travelling hose jacket wherein the viscous liquid penetrates the interstices of the hose jacket which comprises an expanding assembly adapted to be disposed in a fixed position within the hose jacket and a doctor assembly adapted to be disposed in a fixed position contiguous with the outside surface of the hose jacket and in operative, opposed association with the expanding assembly through the wall of said hose jacket, said expanding assembly comprising a mandrel having a plurality of expanding elements which are biased toward the opposed doctor assembly to form a generally cylindrical supporting surface within the hose jacket, and said doctor assembly comprising an elastic ring member adapted to be disposed around the outer surface of the hose jacket opposite to said expanding assembly for pressing the viscous liquid into the interstices of the hose jacket while removing excess viscous liquid from the outer surface of the hose jacket.

2. The applicator apparatus of claim 1 wherein an expanding device is connected to the expanding assembly and is adapted to extend along the longitudinal axis of the hose jacket, said expanding device being spring biased to maintain the hose jacket in a substantially inflated state.

3. The applicator apparatus of claim 1 wherein the elastic ring member is supported by a pair of ring supporters.

4. The applicator apparatus of claim 3 wherein the ring supporters have a semi-circular configuration with a correspondingly shaped groove which is adapted to receive the elastic ring member.

5. The applicator apparatus of claim 4 wherein the ring supporters are disposed in a frame assembly and means are provided in said frame assembly for varying the force to said ring supporters and in turn to said elastic ring member.

6. The applicator apparatus of claim 1 wherein the mandrel includes a longitudinal shaft containing a slidable ring and a fixed supporting element with a spring being compressed therebetween, said spring applying pressure in the slidable ring which in turn applies an outward pressure on said plurality of expanding elements.

7. The applicator apparatus of claim 1 wherein the side edges of said plurality of expanding elements have one or more protruding and indented portions which compliment each other like a jigsaw puzzle.

8. The applicator apparatus of claim 1 wherein pivot means are operatively associated with the mandrel for biasing said expanding elements.

9. An apparatus for sequentially applying a more viscous liquid and a less viscous liquid to the surface of a travelling hose jacket which comprises at least one container means adapted to contain a viscous liquid, at least one container means adapted to contain a less viscous liquid, means for sequential conveying the hose jack to be coated through said respective containers and applicator means disposed downstream from said container means which is adapted to contain the viscous liquid for uniformly distributing the viscous liquid on the surface of said travelling hose jacket, said applicator means comprising an expanding assembly adapted to be disposed in a fixed position within the hose jacket and a doctor assembly adapted to be disposed in a fixed position contiguous with the outside surface of the hose jacket and in operative, opposed association with the expanding assembly through the wall of said hose jacket, whereby the viscous liquid is pressed into the interstices of the hose jacket by said applicator means which removing excess viscous liquid from the outer surface of the hose jacket and the less viscous liquid is subsequently applied to the viscous liquid treated hose jacket.

10. The apparatus of claim 9 wherein the expanding assembly comprises a mandrel having a plurality of expanding elements which are biased toward the opposing doctor assembly to form a generally cylindrical supporting surface within the hose jacket.

11. The apparatus of claim 10 wherein the doctor assembly is an elastic ring member adapted to be disposed around the outer surface of the hose jacket.

12. The apparatus of claim 11 wherein an expanding device is connected to the expanding assembly and is adapted to extend along the longitudinal axis of the hose jacket, said expanding device being spring biased to maintain the hose jacket in a substantially inflated state.

13. The apparatus of claim 9 wherein heat means are disposed downstream of at least one of said containers for fixing the more viscous and less viscous liquid to the hose jacket.

* * * * *